(12) United States Patent
Cohen et al.

(10) Patent No.: US 9,613,656 B2
(45) Date of Patent: Apr. 4, 2017

(54) SCALABLE STORAGE PROTECTION

(71) Applicant: LSI Corporation, Milpitas, WA (US)

(72) Inventors: Earl T. Cohen, Oakland, CA (US); Robert F. Quinn, Campbell, CA (US)

(73) Assignee: Seagate Technology LLC, Cupertino, CA (US)

( * ) Notice: Subject to any disclaimer, the term of this patent is extended or adjusted under 35 U.S.C. 154(b) by 132 days.

(21) Appl. No.: 13/688,654

(22) Filed: Nov. 29, 2012

(65) Prior Publication Data

US 2014/0064048 A1 Mar. 6, 2014

Related U.S. Application Data

(60) Provisional application No. 61/696,720, filed on Sep. 4, 2012.

(51) Int. Cl.
*G11B 20/18* (2006.01)
*G06F 3/06* (2006.01)
*G06F 11/10* (2006.01)

(52) U.S. Cl.
CPC .......... *G11B 20/1803* (2013.01); *G06F 3/065* (2013.01); *G06F 3/067* (2013.01); *G06F 3/0613* (2013.01); *G06F 3/0619* (2013.01); *G06F 3/0689* (2013.01); *G06F 11/1076* (2013.01); *G06F 2211/1028* (2013.01)

(58) Field of Classification Search
CPC ........ G06F 3/0607; G06F 8/65; G06F 3/0608; G06F 3/0674; G06F 3/0689
USPC ...................................................... 714/6.32
See application file for complete search history.

(56) References Cited

U.S. PATENT DOCUMENTS

| 8,219,887 | B2 | 7/2012 | Pruthi | |
|---|---|---|---|---|
| 8,725,940 | B2 | 5/2014 | Grube et al. | |
| 2003/0188097 | A1* | 10/2003 | Holland et al. | 711/114 |
| 2007/0050578 | A1* | 3/2007 | Fujibayashi | 711/162 |
| 2007/0253327 | A1* | 11/2007 | Saha | H04J 3/14 370/218 |
| 2012/0023291 | A1* | 1/2012 | Zeng et al. | 711/114 |
| 2012/0089778 | A1 | 4/2012 | Au et al. | |
| 2013/0054927 | A1* | 2/2013 | Raj et al. | 711/170 |
| 2013/0219119 | A1* | 8/2013 | Galbraith et al. | 711/114 |
| 2013/0290805 | A1* | 10/2013 | Borthakur et al. | 714/752 |

FOREIGN PATENT DOCUMENTS

| CN | 1873622 A | 12/2006 |
|---|---|---|
| CN | 101650677 A | 2/2010 |
| CN | 102609479 A | 7/2012 |
| WO | 2001061491 A1 | 8/2001 |

* cited by examiner

*Primary Examiner* — Jigar Patel
(74) *Attorney, Agent, or Firm* — Suiter Swantz pc llo

(57) ABSTRACT

The disclosure is directed to protecting data of a scalable storage system. A scalable storage system includes a plurality of nodes, each of the nodes having directly-attached storage (DAS), such as one or more hard-disk drives and/or solid-state disk drives. The nodes are coupled via an inter-node communication network, and a substantial entirety of the DAS is globally accessible by each of the nodes. The DAS is protected utilizing intra-node protection to keep data stored in the DAS reliable and globally accessible in presence of a failure within one of the nodes. The DAS is further protected utilizing inter-node protection to keep data stored in the DAS reliable and globally accessible if at least one of the nodes fails.

21 Claims, 3 Drawing Sheets

SCALABLE STORAGE PROTECTION

PRIORITY

The present application claims priority to U.S. Provisional Application Ser. No. 61/696,720, entitled SCALABLE STORAGE PROTECTION, By Earl Cohen et al., filed Sep. 4, 2012, which is currently co-pending, or is an application of which a currently co-pending application is entitled to the benefit of the filing date.

BACKGROUND

Scalable storage systems with directly attached disks require redundancy mechanisms for data protection. Within a single node, such as a single server, various techniques are used for protection of directly-attached storage (DAS), such as RAID-5, RAID-6, other RAID levels, or variations thereof. In distributed systems or in large-scale storage systems, such as large JBOD complexes, erasure-coding techniques are used to provide protection by distributing error-correction coding over a larger number of disks. Erasure-coding, however, requires shipping (i.e. sending and receiving) large amounts of data. In some embodiments, data must be updated at r separate disks to handle r out of n drive failures. When combined with resiliency against node failures, the foregoing systems tend to become very expensive in an amount of redundancy and/or in an amount of data that must be shipped between nodes for updating or for recovery.

SUMMARY

An embodiment of the disclosure is directed to a storage system including a plurality of processing nodes in communication with one another. Each processing node includes a plurality of disks in communication with at least one host. The host is configured for writing data to a selected disk of the plurality of disks. A local redundancy computation unit is configured for determining local redundant data utilizing data written to the selected disk by the host. The local redundancy computation unit is further configured for storing local redundant data on at least one disk of the plurality of disks. A delta computation unit is configured for determining delta data utilizing data written to the selected disk by the host. The delta computation unit is further configured for sending delta data to at least one other processing node. A global redundancy computation unit is configured for receiving delta data from at least one other processing node. The global redundancy computation unit is further configured for determining global redundant data utilizing delta data received from the other processing node and storing global redundant data on at least one disk of the plurality of disks.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1:
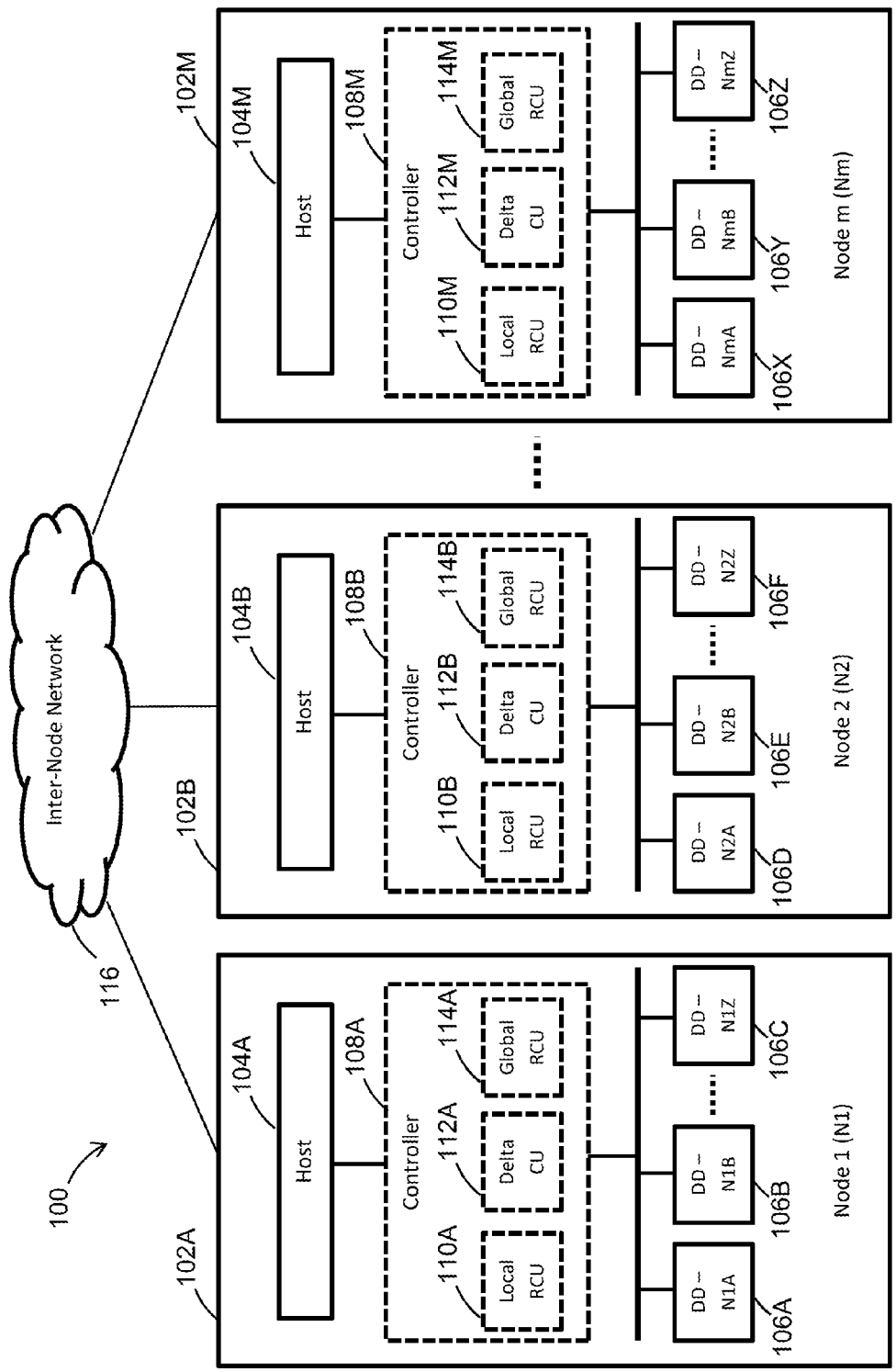
FIG. 1 is a block diagram illustrating a scalable storage system, in accordance with an embodiment of the disclosure.
Figure 2:
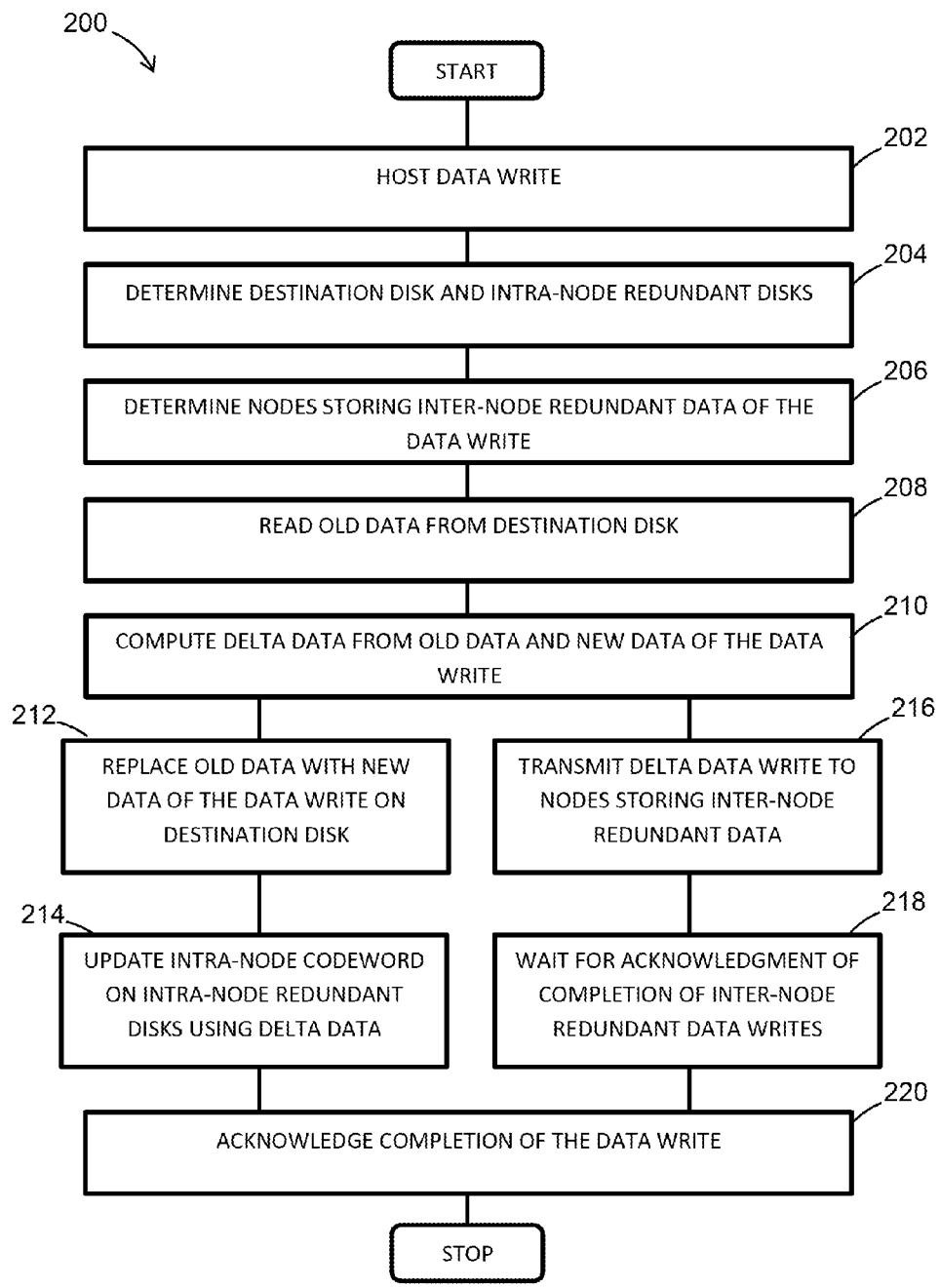
FIG. 2 is a flow diagram illustrating a method of processing a host data write, in accordance with an embodiment of the disclosure.
Figure 3:
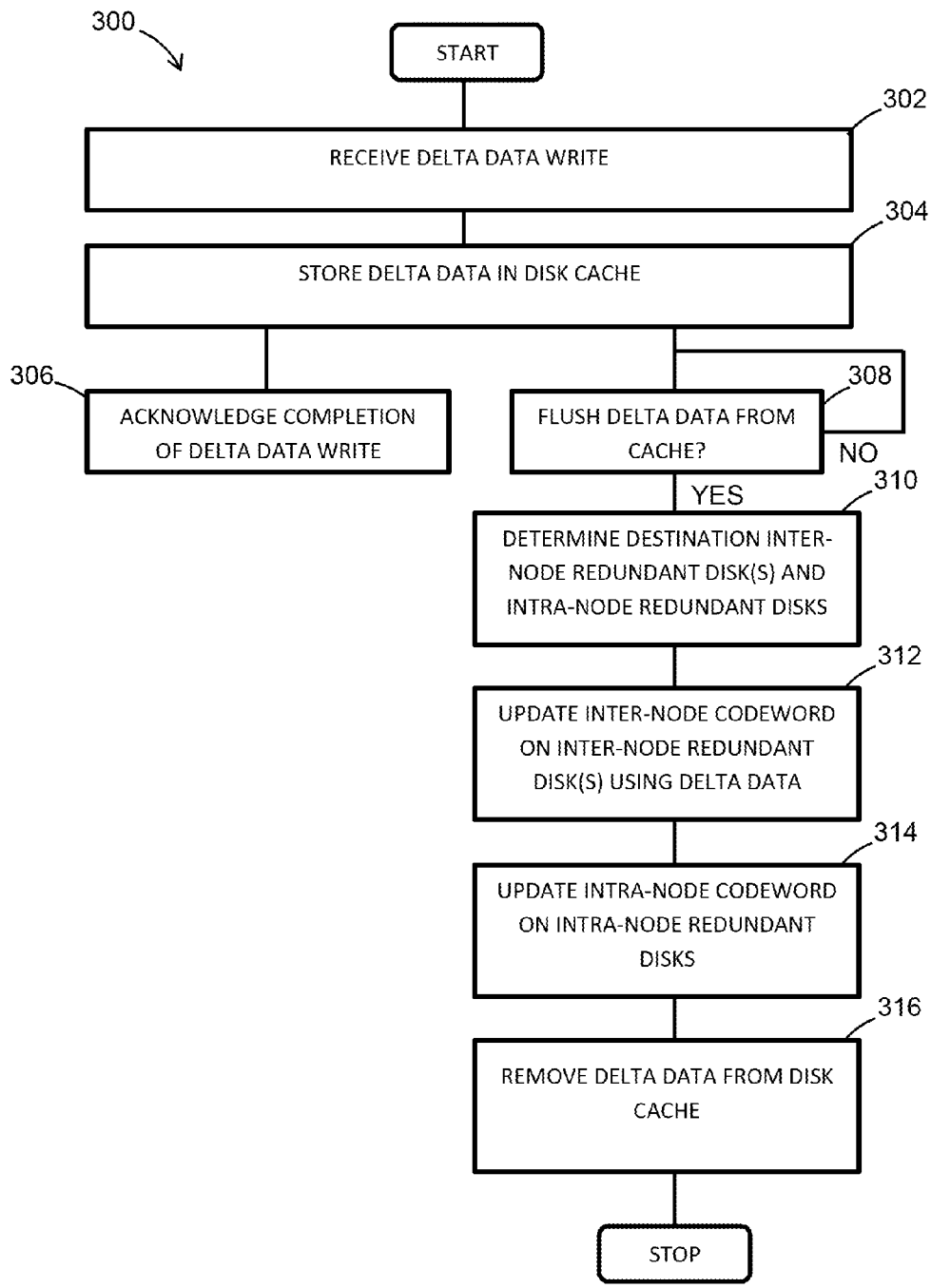
FIG. 3 is a flow diagram illustrating a method of processing delta data, in accordance with an embodiment of the disclosure.

FIGS. 1 through 3 generally illustrate embodiments of a system and method for protecting at least one scalable storage system. Some challenges in scalable storage systems include providing a combination of global access to all data, resiliency from disk failures, and mechanisms for handling failures of one or more processing nodes. At least some of the foregoing challenges are accomplished by balancing redundancy at the intra-node level to protect against intra-node failures, such as hard disk drive (HDD) failures, with redundancy at the inter-node level to protect against failures of one or more of the nodes, such as failures of the intra-node protection. In some embodiments, caching at the nodes in a distributed manner further improves local performance of each of the nodes and improves the system-level performance of the scalable storage system by enabling earlier acknowledgements of writes used for data protection.

FIG. 1 illustrates an embodiment of a storage system 100 such as, but not limited to, a scalable directly-attached storage (DAS) system. The system 100 includes a plurality of processing nodes 102, such as servers. Each of the processing nodes 102 includes respective (i.e. local) host 104 (such as one or more processors or CPUs), and respective (i.e. local) DAS 106, such as a plurality of disk drives 106. In various embodiments, the local DAS 106 are communicatively coupled to the local host 104 via one or more respective (i.e. local) I/O controllers 108. A substantial entirety, such as all, of the storage 106A-106Z is globally visible to all of the processing nodes 102. The DAS 106A-106C of a particular processing node 102A is termed the respective "local storage" of the particular processing node 102A. DAS 106D-106Z of other processing nodes 102B-102M is termed the respective "foreign storage" of the particular processing node 102A. The processing nodes 102 are in communication with one another via an inter-node communication network 116 such as, but not limited to, a serial attached small computer system interface (SAS) switching interconnect. The processing nodes 102 have access to the substantial entirety of the storage 106A-106Z through the inter-node communication network 116. In some embodiments, however, access to the respective local storage 106A-106C of a particular processing node 102A is quicker and/or higher in bandwidth than access to the respective foreign storage 106D-106Z. In some embodiments, the inter-node communication network 116 includes, but is not limited to, at least one SAS fabric, Ethernet network, InfiniBand network, peripheral component interconnect express (PCIe) interconnect network, Local Area Network (LAN), Wide Area Network (WAN), proprietary network, or any combination of the foregoing.

In some embodiments, the system 100 further includes locking and/or coherency mechanisms to facilitate sharing of the storage 106. For example, a directory-based caching mechanism enables tracking ownership and/or modification of data. In some embodiments, each of the processing nodes 102 includes a cache, such as a disk cache, to store frequently accessed data. According to various embodiments, some of the frequently-accessed data is local to the processing node and/or some of the frequently-accessed data is foreign. In some embodiments, the disk cache includes, but is not limited to, a solid-state disk drive (SSD).

Some failure scenarios of concern in multi-node storage systems 100, include:
- Failure of one or more input/output (I/O) devices, such as HDDs or SSDs 106 of a processing node 102;
- Failure of a pathway to one or more of the I/O devices 106 within one of the processing nodes 102;
- Failure of some or all of a processing node 102, such as a host 104 or intra-node communication infrastructure; and
- Failure of higher-level communication infrastructure, such as the inter-node communication network 116, coupling the processing nodes 102.

These failures are categorized as intra-node or inter-node failures. An intra-node failure is one that renders at least a portion of a processing node 102 unusable but does not prevent continued operation of the processing node 102, including global access to data that is local to the processing node 102. An inter-node failure is one that renders a processing node 102 or at least a portion of data that is local to the processing node 102 unusable. Some intra-node failures are fixable at a level of the affected processing node 102, and are not globally visible to other processing nodes 102 (except for possible performance impacts).

Failures are also characterized as hard (e.g. solid, repeatable) or as soft (e.g. one-time, transient, goes away after a power-cycle). Many node failures are soft, such as software crashing, and are thus transient or short in duration. Disk failures are also either soft (e.g. a transient, uncorrectable error that is recoverable by writing new data) or hard (e.g. failure of the disk due to a head crash). Failure duration, hence hard versus soft failure categorization, is relevant for computing probability of failure based on how many contemporaneous errors of various types are considered. In some embodiments, probability of simultaneously having multiple processing node failures if most processing node failures are soft failures is less than probability of simultaneously having multiple processing node failures if most processing node failures are hard failures.

A system-level failure is a failure of the multi-node storage system 100, such as an unrecoverable loss of any of the host-written (i.e., non-redundant) data stored on any of the processing nodes 102 or a loss of more than a specified number of the processing nodes 102. In some embodiments, the system 100 is designed, at least in part, to reduce probability of system-level failure to less than a specified value.

Simple erasure-coding solutions tend to entail a high amount redundancy and/or data shipping. For example, consider m nodes 102, each including n disks 106 (such as HDDs or SSDs), thus a total of m*n disks 106. To protect against a failure of any 3 disks 106, at least three of the disks 106 must include redundant data. Any write to any of the other (m*n−3) data (i.e. non-redundant) disks 106 requires an update of the 3 redundant disks 106. When a host 104, such as a processor, performs a small, random write (e.g. 4 KB or 8 KB write) to one of the data disks 106, four similar-sized writes must be done in total, and three of the four writes involve computations (i.e. updating the redundant data based on old data prior to the host write and new data written by the host). Furthermore, if one or more node failures are to be handled with erasure-coding, the three redundant disks 106 are preferably located on different nodes 102. Accordingly, the host write requires: reading old data from a selected data disk 106A of a node 102A including the selected data disk; replacing old data with new data provided by the host 104 by writing the new data to the selected data disk 106A; computing a function, such as a delta, between the old data and the new data; shipping the delta to the three redundant disks 106, which may be located on different nodes 102; reading an old version of the redundant data on each node 102 that includes one of the redundant disks 106; determining an update to the redundant data utilizing the delta; and writing back a new version of the redundant data. Shipping the delta to multiple nodes 102 consumes both latency and power. In some embodiments, a further delay occurs because the host write cannot be acknowledged until the host write data is "safe", and the host write data is not safe until the redundant data writes are complete.

A single protection solution that works well for failures within a node 102, such as RAID, may not be adequate across a plurality of nodes 102. A global solution such as erasure-coding, illustrated in the foregoing example, may be too costly in terms of an amount of data that is shipped between nodes 102. Furthermore, various failure scenarios have different likelihoods. Typically, decreasing probability of system-failure is more important than separately decreasing probability of disk failure or probability of node failure. In some embodiments, the system 100 is configured for achieving one or more of: less data shipped between nodes; higher performance; lower cost (e.g. lowering an amount of redundancy required for a given system-level failure probability); lower power; lower latency; and other power, cost, and performance metrics. For example, failures of individual hard disk drives 106 can be very likely. In some embodiments, therefore, probability of system-failure is decreased by providing more redundancy to protect against hard disk drive failures and less for node failures, thereby decreasing probability of system-failure without overly compromising performance or requiring high data shipping or redundancy costs.

In an embodiment (see FIG. 1), the system 100 includes a first type of protection (i.e. "inner", "local", or "intra-node" protection) to protect data stored in I/O devices 106 within a node 102, and a second type of protection (i.e. "outer", "global", or "inter-node" protection) to protect against failures of one or more nodes 102. The foregoing scalable storage protection scheme decreases an amount of data that must be shipped between nodes 102 for protection and for recovery. Furthermore, a delta-caching mechanism decreases time required to acknowledge that a host write is safely stored.

In some embodiments, the system 100 includes separate mechanisms 110, 114 to protect against local (i.e. intra-node) vs. global (i.e. inter-node) failures. In further embodiments, the local protection mechanisms 110 and global protection mechanisms 114 are each selected to reduce a respective failure probability, thereby reducing an overall system-level failure probability to a specified level. In various embodiments, the local protection mechanisms 110 and global protection mechanisms 114 are each selected to reduce an amount of data that is shipped among nodes 102 for redundant data storage and recovery from failures.

In some embodiments, the system 100 with scalable storage protection offers cost advantages. For example, consider the previously described simple, erasure-coding with m nodes 102 each with n disks 106 and a requirement to protect against 3 disk failures, and assuming the redundant disks 102 are all on different nodes 102. The simple, erasure-coding approach is shipping three times as much data as the write data to other nodes 102 for redundancy. The multiple layer protection offered by the system 100 with scalable storage protection allows flexible balancing. For example, in some embodiments the system 100 is designed based on various failure probabilities (e.g. hard failures versus soft failures) or expense factors (e.g. expense of shipping data).

In an exemplary embodiment of the system 100 with scalable storage protection instead of the simple, erasure-coding approach described above, two of n disks 106 at each of the nodes 102 include redundant local data of that node 102, and one or more of the m nodes 102 (i.e. redundant nodes) include globally redundant data. In an embodiment with one redundant node 102, when a host 104 performs a small, random write (e.g. 4 KB or 8 KB write) to one of the data disks 106, four similar-sized writes must be done in total, but three of the similar-sized writes are local (i.e. the host write data and two local redundant data writes). Only one of the similar-sized writes must be shipped to the redundant node 102. Compared to the simple, erasure-coding example, the amount of data to be shipped is reduced (e.g. ⅔ as much). In the foregoing example, the system 100 with scalable storage protection is able to handle at least three disk failures. In some embodiments, the system 100 is enabled to handle two disk failures per node 102.

In the foregoing example, three disk failures on one node 102 is substantially equivalent or similar to failure of a node 102 because the two redundant disks 106 of each node 102 are only able to correct for failures of two of the n disks 106 at the node 102. In some embodiments, probability of intra-node protection failing is included in probability of the node 102 failing and is utilized, at least in part, to determine a required level of inter-node protection. The simple, erasure-coding approach is able to handle up to three node failures, but a consequence of this is that a higher percentage of the nodes 102 are used to process globally redundant data. If node failure probability is small compared to disk failure probability, the scalable storage protection alternative offers equivalent or better protection at a lower cost in at least one of I/O shipping and redundancy.

The foregoing examples illustrate at least some advantages of the system 100 with scalable storage protection compared to a simple, erasure-coding protected system. However, the examples are not intended to limit the disclosure in any way. According to various embodiments, the system 100 includes any combination of selected parameters and configurations implementing the scalable storage protection scheme generally described herein. In an embodiment, the system 100 includes m nodes 102, each with n disks 106. The system 100 is configured to survive k node failures (e.g. k=2). Every group of g disks includes at least h redundant disks 106 to handle disk-level failures adequately (e.g. h=3 out of g=10 disks 106 are redundant).

In some embodiments, g=n by appropriate scaling of h. Accordingly, the system 100 includes m*n total disks 106 and h*m of the disks 106 store redundant data. To survive k of m node failures, the redundant disks 106 in one codeword (e.g. one protection group) are on at least k different nodes 102. None of the m nodes 102 is able to have more than h*m/k of the redundant disks 106 that are protected by a same codeword. Otherwise, k node failures may not be survivable. In an embodiment, therefore, n is greater than h*m/k or redundant data must be present on more than k of the nodes 102. For example, if n=10, m=8, h=3, and k=2, then 24 redundant disks 106 out of 80 are required. However, there are only 10 disks 106 per node 102 so the redundant disks must be spread among at least three nodes, even though k is only 2.

Erasure-coding may be able to meet reliability requirements; however, it has a number of deficits including the following. An h of g erasure code is computationally expensive If h is larger than k, then either one node 102 must process multiple erasure code updates (leading to unbalanced computational effort), or required I/O shipping is proportional to h rather than k. If n is less than h*m/k, then I/O shipping is greater than proportional to k. Recovery from even a single disk failure generally requires I/O shipping. Furthermore, system-level performance is typically poor because having at least one failed disk 106 is common and I/O shipping is often required for recovery.

The system 100 with scalable storage protection includes an intra-node protection mechanism 110 using local redundancy to protect against intra-node failures, such as disk failures, and an inter-node protection mechanism 114 using global redundancy to protect against inter-node failures, such as node failures. According to various embodiments, the system 100 offers several advantages including one or more of: I/O shipping is based on a selected number of survivable node failures and is orthogonal to handling of disk failures; hard disk failures are recoverable locally without I/O shipping with up to a specified reliability level being recoverable with intra-node protection; shorter, simpler coding types are used to achieve a specified level of system-failure probability, allowing for more efficient hardware; and other performance, efficiency, and/or scalability advantages.

The intra-node protection mechanism 110 includes one or more coding types, such as one or more of: RAID-1; RAID-2; RAID-3; RAID-4; RAID-5; RAID-6; any other RAID level; an erasure code, such as a Reed-Solomon code, a fountain code, a Raptor code, a rate-less erasure code, or an Online code; and any combination of the foregoing. The inter-node protection mechanism 114 includes one or more coding types, such as one or more of: RAID-1; RAID-2; RAID-3; RAID-4; RAID-5; RAID-6; any other RAID level; an erasure code, such as a Reed-Solomon code, a fountain code, a Raptor code, or an Online code; and any combination of the foregoing.

Data stored on a plurality of disks 106 that is protected by one instance of the intra-node protection mechanism 110 or the inter-node protection mechanism 114 is referred to as a codeword. For example, data stored on five disks, one of which is redundant as in RAID-5, represents one codeword for each separately readable and correctable set of the data. RAID-5 is operable at a byte level, whereas many disks are only able to read 512 B sectors of data, hence in such a case, each codeword would be a number of 512 B sectors, one sector from each of the five disks.

In some embodiments, the intra-node protection mechanism 110 and the inter-node protection mechanism 114 are both configured for a same coding type. For example, in various embodiments, both the intra-node protection mechanism 110 and the inter-node protection mechanism 114 use a two-erasure-correcting code, such as in RAID-6, or both can use a one-erasure-correcting code, such as in RAID-5. In other embodiments, the intra-node protection mechanism 110 and the inter-node protection mechanism 114 use different coding types. For example, in some usage scenarios, the intra-node protection mechanism 110 uses a two-erasurecorrecting code and the inter-node protection mechanism 114 uses a one-erasure-correcting code, such as in RAID-5.

Computations of the intra-node protection mechanism 110 and the inter-node protection mechanism 114 are according to a respective coding type. For example, a one-erasure-correcting RAID-5 coding type requires XOR computations, and a RAID-6 coding type requires computations according to a two-erasure-correcting code, such as a Reed-Solomon code.

Each of the plurality of processing nodes 102 of the system 100 includes at least one host 104, such as a processor, in communication with a plurality of disks 106 of each node 102. In some embodiments, the host 104 includes, but is not limited to, at least one single-core or multiple-core CPU. In some embodiments, an I/O controller 108 is configured for coupling the disks 106 to the host 104. Each node 102 further includes local memory, such as cache memory and/or DRAM memory. Each node 102 further includes a respective set of one or more disks 106, such as hard disk drives and/or solid-state disks. Each node 102 further includes an inter-node communication mechanism communicatively coupling the nodes via the inter-node communication network 116, such as a network interface card or any other components present in networked processing systems known to the art.

In some embodiments, the host 104 includes one or more multi-core x86-architecture CPU chips. In some embodiments, the I/O controller 108 includes a Raid-On-Chip controller (ROC), and the host 104 is coupled to the I/O controller 108 via a PCIe interconnect. In some embodiments, the one or more disk drives 106 include one or more SAS and/or SATA hard disk drives. In some embodiments, the one or more disk drives 106 include one or more solid-state disk drives. In some embodiments, the inter-node communication mechanism is integrated into the I/O controller 108. For example, a ROC provides SAS and/or SATA connectivity to both local disks 106 and, via a SAS fabric, to disks 106 of other processing nodes 102.

Each processing node 102 further includes a respective intra-node redundancy computation unit 110 configured to determine redundant data for protection of data stored in the disks 106 of the node 102. Each processing node 102 further includes a respective delta redundancy computation unit 112 configured to determine delta data used locally by the intra-node redundancy computation unit 110 and/or sent to other nodes 102 in response to a write of data stored in the disks 106 of the node 102. Each processing node 102 further includes an inter-node redundancy computation unit 114 configured to determine redundant data for protection of data stored in the disks 106 of other the nodes 102.

In some embodiments, one or more of the redundancy computation units 110, 112, and 114 are combined into a single mechanism and/or share one or more components. For example, the redundancy computation units 110, 112, and 114 are, according to various embodiments, embodied in separate or combined hardware, software, and/or firmware modules, such as one or more electronic circuits or program instructions executed from carrier media by at least one processor. In some embodiments, the controller 108 includes one or more of the redundancy computation units 110, 112, and 114 and/or is configured to perform one or more functions of the redundancy computation units 110, 112, and 114.

In some embodiments, a first intra-node protection mechanism (e.g., RAID-5) protects a first subset of the disks 106 of a first processing node 102A, and a second intra-node protection mechanism different from the first intra-node protection mechanism (e.g., RAID-6) protects a second subset of the disks 106 of the first processing node 102A. In further embodiments, the first subset of the disks 106 is of a different type than the second subset of the disks 106. For example, the first subset of the disks 106 may include one or more HDDs, and the second subset of the disks 106 may include one or more SSDs. In some embodiments, a first inter-node protection mechanism provides inter-node protection for disks 106 of the first subset of the disks 106, and a second inter-node protection mechanism (different from the first inter-node protection mechanism) provides inter-node protection for disks 106 of the second subset of the disks 106.

In some embodiments and/or usage scenarios, two or more disks 106 of one of the processing nodes 102 are protected by a same codeword of an inter-node protection mechanism 114. In other embodiments and/or usage scenarios, no more than one of the disks 106 of any of the processing nodes 102 is in a same codeword of an inter-node protection mechanism 114.

In some embodiments, a write of data by the host 104A of a first processing node 102A to one of the disks 106 of the first processing node 104A causes an update of first local (i.e. intra-node) redundant data stored in other disks 106 of the first processing node 102A. The host data write also causes an update of global (i.e. inter-node) redundant data stored in at least some of the disks 106 of a second processing node 102B. In some embodiments, the update of the global redundant data causes an update of second local redundant data stored in other disks of the second processing node 102B. In some embodiments, the host data write is acknowledged subsequent to the update of global redundant data reaching a point of safety, such as when the host data write is recoverable even if the first processing node 102A fails.

FIGS. 2 and 3 respectively illustrate a method 200 of processing a data write and a method 300 of processing delta data to provide scalable storage protection. System 100 is a manifestation of methods 200 and 300 and all steps or features described with regard to embodiments of system 100 or methods 200 or 300 are applicable to both the system 100 and methods 200 and 300. However, it is noted herein that one or more steps of methods 200 or 300 may be executed via other means known to the art. Embodiments of system 100 described herein should not be interpreted to limit methods 200 or 300 in any way.

At step 202, data is written to a selected logical block address (LBA) by a host 104A of a first processing node 102A. At step 204, at least one destination disk 106 of the first processing node 102A storing data of the selected LBA and one or more redundant disks 106 of the first processing node 102A storing intra-node protection data for the destination disk 106 are determined. In some embodiments, the destination and intra-node redundant disks 106 are determined by at least one of the host 104A and the controller 108A of the first processing node 102A. For example, driver software executing on the host 104A of the first processing node 102A determines the destination disk 106, and the controller 108A determines the redundant disks 106. At step 206, one or more redundant processing nodes 102 storing inter-node protection data for the destination disk 106 are determined by at least one of the host 104A and the controller 108A of the first processing node 102A.

At step 208, old data is read from the destination disk 106 at the selected LBA. At step 212, new data of the host data write is written to the destination disk 106 at the selected LBA. At step 210, the delta computation unit 112A of the first processing node 102A determines delta data utilizing the new data and the old data. At step 214, the intra-node redundancy computation unit 110A of the first processing node 102A updates first redundant data stored on the redundant disks 106 of the first processing node 102A according to the delta data.

At step 216, the first processing node 102A sends the delta data to at least one redundant processing node 102, such as a second processing node 102B different from the first processing node 102A. Referring to FIG. 3, the second processing node 102B receives the delta data at step 302, and stores the delta data in the disk cache of the second processing node 102B at step 304. Once the delta data is stored in the disk cache, at step 306, the second processing node 102B is configured to acknowledge completion of the delta data write to the first processing node 102A. At this point, the second processing node is able to participate in recovery of the data written to the selected LBA by the host 104A of the first processing node 102A, if the first processing node 102A were to fail. At step 218, a determination is made that all of the redundant nodes 102 have acknowledged completion of the delta data writes. At step 220, the completion of the host data write is acknowledged to the host 104A of the first processing node 102A.

At step 308, subsequent to storing the delta data in the disk cache of the second processing node 102B, delta data is selectively flushed from the disk cache. In some embodiments, such as where the disk cache is small, step 308 is performed relatively quickly, as compared to other embodiments with a larger disk cache that use algorithms such as least-recently used to determine when to flush. At step 310, in response to flushing or making a determination to flush the delta data from the disk cache, one or more inter-node redundancy disks 106 of the second processing node 102B storing the inter-node protection data corresponding to the delta data and one or more redundant disks 106 of the second processing node 102B storing intra-node protection data for the inter-node redundancy disks 106 are determined by at least one of the host 104B and the controller 108B of the second processing node 102B.

At step 312, the inter-node redundancy computation unit 114B of the second processing node 102B updates global redundant data stored on the inter-node redundancy disks 106 of the second processing node 102B according to the delta data. At step 314, the intra-node redundancy computation unit 1106 of the second processing node 102B updates second local redundant data stored on the redundant disks 106 of the second processing node 102B according to the update of the inter-node redundancy disks 106. At step 316, the delta data is removed from the disk cache of the second processing node 102B. In some embodiments, such as where the disk cache is volatile, step 306 is delayed until after one or more of step 312 and/or step 314 to ensure that the delta data is non-volatilely stored.

In some embodiments, delta data shipped between nodes 102 for computation of global redundant data is a function of old data (prior to a write of data by a host 104) and new data written by the host 104. In some embodiments, delta data is determined utilizing an XOR function or an XNOR function of old data and new data written by the host 104. In other embodiments, delta data includes the old data and the new data, and both old and new data are shipped between nodes 102. In some embodiments, delta data further includes at least one of: an indication of which node generated the delta data; a position within an inter-node protection codeword of a write that caused the delta data to be generated; and other information associated with an origin and/or a position of the delta data.

In some embodiments, inter-node redundancy computation is performed independently on each of one or more nodes 102 storing a portion of the global redundant data. For example, with a RAID-6 coding type using a two-erasure-correcting Reed-Solomon code, delta data is sent to each of two processing nodes 102 storing a portion of the global redundant data, and each of the two processing nodes 102 independently updates a portion of the global redundant data. For a two-erasure-correcting Reed-Solomon code, a position of the delta data within a codeword of the Reed-Solomon code is sent with the delta data, and each of the two processing nodes 102 is configured to independently compute an update to a portion of the global redundant data by determining a corresponding update to a portion of a remainder obtained when data in the position of the delta data within the codeword is divided by a generator polynomial of the Reed-Solomon code.

In some embodiments, delta data is reduced and/or combined locally prior to shipping to others of the nodes for computation of global redundant data. In a first example, a first write of data by the host of a first one of the processing nodes and a second write of data by the host of the first processing node are to a same LBA, and a single delta data is shipped corresponding to both of the first write and the second write. For example, where the function is an XOR, the delta data corresponds to old data (prior to the first write) XORed with second (final) data of the second write. In a second example, a codeword of an inter-node protection mechanism covers two or more disks stored on a first one of the processing nodes, and a write to more than one of the two or more disks causes a single delta data corresponding to the write to be created. Depending on a coding type of the inter-node protection mechanism and a specified reliability, a size of the delta data is equal to a size of the write to just one of the two or more disks.

In some embodiments, a host data write of a first processing node 102A generates a plurality of different delta datas, each to be sent to a corresponding processing node 102 storing a portion of the global redundant data. In other embodiments, a host data write of a first processing node 102A generates a single delta data that is sent to one or more processing nodes 102 storing a portion of the global redundant data.

In some embodiments, a host data write of a first processing node 102A is to one of the disks 106 of a second processing node 102B different from the first processing node 102A (i.e. a "foreign" data write). With respect to the disks 106 of the system 100, the foreign write is performed similarly to a local write. However, data of the foreign write is shipped to the second processing node 102B rather than staying local to the first processing node 102A. In some embodiments, another difference is that an acknowledgment of completion of the foreign write is returned to the first processing node 102A by the second processing node 102B subsequent to the second processing node 102B determining completion of any inter-node redundant writes due to the foreign write.

In some embodiments, at least some of the processing nodes 102 include a disk cache, such as a solid-state disk used as a cache. The disk cache stores one or more of: data (e.g. storage) accessed by the host 104 of the processing node 102; data accessed by the host 104 of another processing node 102; local redundant data of the processing node 102; global redundant data stored on disks 106 of the processing node 102; delta data computed by the processing node 102 and/or received from another processing node 102; and other types of data. In some embodiments, storing delta data received from other processing nodes 102 in the disk cache enables an acknowledgement of safety of the delta data and thus of safety of the corresponding host data write prior to updating of global redundant data and/or the second local redundant data protecting the global redundant data.

In some embodiments, the disk cache of a processing node 102 is managed by one or more of: the host 104 the processing node 102; an I/O controller 108, such as a ROC, of the processing node; a dedicated management processor; and any combination of the foregoing.

In some embodiments, the disk cache tags delta data differently from other types of data. In some embodiments, the delta data is tagged as being both dirty and in delta format, as opposed to being able to be stored directly like non-delta dirty data. In order to flush the delta data from the disk cache of a first processing node 102A, the inter-node redundancy computation unit 114A of the first processing node 102A is configured to update global redundant data stored in the disks 106 of the first processing node 102A according to the delta data, prior to the delta data being deleted or removed from the disk cache. In some embodiments, updating the global redundant data stored in the disks 106 of the first processing node 102A includes updating intra-node redundant data protecting the global redundant data. The intra-node redundant data stored in other disks of the first processing node 102A is updated via the intra-node redundancy computation unit 110A of the first processing node 102A.

In some embodiments wherein delta data is stored in the disk cache of a processing node 102, the processing node 102 receiving delta data performs at least a portion of the inter-node redundancy computation on the delta data prior to storing the delta data in the disk cache and stores a transformed version of the delta data in the disk cache. For example, for a multiple-erasure-correcting code, the received delta data is not in a form that is directly able to be combined into global redundant data stored in the processing node 102. By transforming the received delta data using the inter-node redundancy computation unit 114, the transformed delta data is able to be later combined with the global redundant data via a simpler operation, such as an XOR function. In some embodiments, storing the transformed version of the delta data in the disk cache further enables combining subsequently received delta data into the transformed version of the delta data, advantageously saving space in the disk cache. For example, with a Reed-Solomon code as the inter-node protection coding type, the delta data is transformed according to a generator polynomial of the Reed-Solomon code into an update (via XOR) to a portion of a codeword remainder stored as the global redundant data.

In some embodiments cached delta data is updated or combined in the disk cache. For example, first delta data corresponding to a first write at a selected logical block address (LBA) by a host 104A of a first processing node 102A is stored in the disk cache of a second processing node 102B, and second delta data corresponding to a second write at the selected LBA is received by the second processing node 102B. The disk cache of the second processing node 102B is configured to update the first delta data according to the second delta data so that only a single update of the global redundant data stored in the disks 106 of the second processing node 102B is required for both of the first write and the second write. For example, if the delta data is computed at the first processing node 102A utilizing an XOR function, the first delta data is updated by an XOR operation with the second delta data.

In some embodiments, first delta data corresponding to a first write by the host 104A of the first processing node 102A to data protected by an inter-node protection codeword is stored in the disk cache of a second processing node 102B, and second delta data corresponding to a second write to data protected by the inter-node protection codeword is received by the second processing node 102B. The disk cache of the second processing node 102B is configured to update the first delta data according to the second delta data so that only a single update of the global redundant data stored in the disks 106 of the second processing node 102B is required for both of the first write and the second write.

In some embodiments, local redundant data is distributed among the disks 106 of a processing node 102 in a determined fashion, such as by a CRUSH (Controlled Replication Under Scalable Hashing) algorithm or another data distribution algorithm. In some embodiments, global redundant data is distributed among the disks 106 of two or more of the processing nodes 102 in a determined fashion, such as by the CRUSH algorithm or another data distribution algorithm. For example, a first inter-node protection codeword spans disks 106 on a first subset of the processing nodes 102, and a second inter-node protection codeword spans disks 106 on a second subset of the processing nodes 102 different from the first subset. In some embodiments, the first subset and the second subset overlap (i.e. include a at least one processing node 102 in common).

In some embodiments, the intra-node redundancy computation unit 110 is part of and/or integrated into one or more of the disks 106. For example, some SSDs implement a RAID-5-like or RAID-6-like redundancy mechanism protecting data stored in non-volatile memory chips of the SSD. The redundancy mechanism of the SSD is able to serve as the intra-node redundancy computation unit 110 for data stored in the SSD.

In some embodiments, the processing nodes 102 are substantially identical or similarly configured. In other embodiments, the processing nodes 102 are not all symmetric, either in number and/or configuration of the host(s) 104, amount of the local memory, number, configuration, type, and/or capacity of the disks, or in any other parameter(s), component(s), or configuration(s).

In some embodiments, at least some of the processing nodes 102 have limited or no processing ability, and are effectively "disk-only." The disk-only processing nodes 102 participate in global redundancy computation, such as by storing a portion of the global redundancy. In some embodiments, one of the processing nodes 102 becomes disk-only due to a crash of the respective host 104, provided that at least some storage of the disk-only processing node 102 is still globally accessible. Accordingly, foreign writes from other processing nodes 102 to storage of the disk-only processing node 102 are still able to cause delta data to be generated and transmitted, such as by a controller 108 (e.g. a ROC) of the disk-only processing node 102.

In some embodiments, a plurality of intra-node protection mechanisms 110 and/or inter-node protection mechanisms 114 are used according to one or more of: a type and/or a reliability of the disks 106 being protected; a type of data stored in the disks 106 being protected; a probability of failure of the nodes 102 covered by a selected inter-node protection mechanism 114; and other factors.

It should be recognized that in some embodiments the various steps described throughout the present disclosure may be carried out by a single computing system or multiple computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

Embodiments manifesting methods described herein may include storing results in a storage medium. After the results have been stored, the results are accessible in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A storage system, comprising:
 a plurality of processing nodes in communication with one another, each processing node including:
  a plurality of disks local to a respective processing node;
  at least one host, the at least one host configured to write data to a first selected disk of the plurality of disks;
  a local redundancy computation unit configured to determine local redundant data utilizing the data written to the first selected disk by the at least one host to establish a redundancy protection for the data written in the respective processing node, the local redundant data being stored on at least one disk of the plurality of disks;
  a delta computation unit configured to determine a first delta data utilizing the data written to the first selected disk by the at least one host, the delta computation unit further configured to send the determined first delta data to at least one other processing node; and
  a global redundancy computation unit configured to receive a second delta data from at least a second processing node of the plurality of processing nodes, the global redundancy computation unit further configured to determine global redundant data utilizing the received second delta data, the global redundant data establishing a redundancy protection for data contained in the at least the second processing node, the global redundant data being stored on at least one disk of the plurality of disks,
  wherein the second delta data is derived from data written to a second selected disk of a plurality of disks foreign to the respective processing node.

2. The system of claim 1, wherein the local redundancy computation unit is further configured to recover the data written to the first selected disk utilizing the local redundant data when the first selected disk fails.

3. The system of claim 1, wherein the global redundancy computation unit is further configured to recover data of the at least a second processing node utilizing the global redundant data when the at least a second processing node fails, and wherein the second delta data is sent by a second local redundancy computation unit of the at least the second processing node.

4. The system of claim 1,
 wherein the local redundant data is first local redundant data,
 wherein the local redundancy computation unit is further configured to determine second local redundant data utilizing the global redundant data, and
 wherein the second local redundant data is stored on at least one disk of the plurality of disks local to the respective processing node.

5. The system of claim 4,
 wherein the local redundancy computation unit is further configured to recover the data written to the first selected disk utilizing the local redundant data when the first selected disk fails,
 wherein the global redundancy computation unit is further configured to recover data of the at least the second processing node utilizing the global redundant data when the at least the second processing node fails, and
 wherein the local redundancy computation unit is further configured to recover the global redundant data utilizing the second local redundant data when the at least one disk storing the global redundant data fails.

6. The system of claim 1, wherein the plurality of processing nodes includes a first set of disks of the pluralities of disks among the processing nodes protected via a first global coding type and a second set of disks of the pluralities of disks among the processing nodes protected via a second global coding type, wherein the first global coding type is different from the second global coding type.

7. The system of claim 6, wherein the first set of disks includes at least one disk of a first processing node of the plurality of processing nodes and at least one disk of a second processing node of the plurality of processing nodes.

8. The system of claim 1, wherein the local redundancy computation unit is further configured to process data utilizing a first erasure-correcting code type, wherein the global redundancy computation unit is further configured to process data utilizing a second erasure-correcting code type, and wherein the first erasure-correcting code type is different from the second erasure-correcting code type.

9. The storage system of claim 1,
 wherein the local redundant data is stored on the at least one disk of the plurality of disks using local redundant data writes to the at least one disk of the plurality of disks;
 wherein the at least one other processing node is configured to receive the first delta data to perform global redundant data writes; and wherein the global redundant data writes are less than the local redundant data writes.

10. A storage system, comprising:
a plurality of processing nodes in communication with one another, each processing node including:
a plurality of disks local to a respective processing node;
at least one host, the at least one host configured to write data to a first selected disk of the plurality of disks; and
a controller in communication with the plurality of disks, the controller configured to:
determine local redundant data utilizing the data written to the first selected disk to establish a redundancy protection for the data written in the respective processing node;
store the local redundant data on at least one disk of the plurality of disks;
determine a first delta data utilizing the data written to the first selected disk;
send the determined first delta data to at least one other processing node of the plurality of processing nodes;
receive a second delta data from at least a second processing node of the plurality of processing nodes, wherein the second delta data is derived from data written to a second selected disk of a plurality of disks foreign to the respective processing node;
determine global redundant data utilizing the received second delta data, the global redundant data establishing a redundancy protection for data contained in the at least the second processing node; and
store the global redundant data on at least one disk of the plurality of disks local to the respective processing node.

11. The system of claim 10, wherein the controller is further configured to:
recover the data written to the first selected disk utilizing the local redundant data when the first selected disk fails; and
recover data of the at least the second processing node utilizing the global redundant data when the at least a second processing node fails.

12. The system of claim 11,
wherein the local redundant data is first local redundant data, and
wherein the controller is further configured to:
determine second local redundant data utilizing the global redundant data;
store the second local redundant data on at least one disk of the plurality of disks local to the respective processing node; and
recover the global redundant data utilizing the second local redundant data when the at least one disk storing the global redundant data fails.

13. The system of claim 10, wherein the plurality of processing nodes includes a first set of disks of the pluralities of disks among the processing nodes protected via a first global coding type and a second set of disks of the pluralities of disks among the processing nodes protected via a second global coding type, wherein the first global coding type is different from the second global coding type.

14. The system of claim 13, wherein the first set of disks includes at least one disk of a first processing node of the plurality of processing nodes and at least one disk of a second processing node of the plurality of processing nodes.

15. The system of claim 10, wherein the controller is further configured to:
determine the local redundant data utilizing a first erasure-correcting code type; and
determine the global redundant data utilizing a second erasure-correcting code type, wherein the first erasure-correcting code type is different from the second erasure-correcting code type.

16. A method of storage protection, comprising:
writing data to a first selected disk of a plurality of disks local to a first processing node of a plurality of processing nodes, the plurality of processing nodes being in communication with one another;
determining local redundant data utilizing the data written to the first selected disk to establish a redundancy protection for the data written in the first processing node;
storing the local redundant data on at least one disk of the plurality of disks;
determining first delta data utilizing the data written to the first selected disk;
sending the first delta data to at least one other processing node;
receiving second delta data at the first processing node from at least a second processing node, wherein the second delta data is derived from data written to a second selected disk of a plurality of disks local to the at least a second processing node;
determining global redundant data utilizing the second delta data, the global redundant data establishing a redundancy protection for data contained in the at least the second processing node; and
storing the global redundant data on at least one disk of the plurality of disks local to the first processing node.

17. The method of claim 16, wherein the method further includes:
recovering the data written to the first selected disk of the first processing node utilizing the local redundant data when the first selected disk fails; and
recovering data of the at least the second processing node utilizing the global redundant data when the at least the second processing node fails.

18. The method of claim 17,
wherein the local redundant data is first local redundant data, and
wherein the method further includes:
determining second local redundant data utilizing the global redundant data;
storing the second local redundant data on at least one disk of the plurality of disks local to the first processing node; and
recovering the global redundant data utilizing the second local redundant data when the at least one disk storing the global redundant data fails.

19. The method of claim 16, wherein the method further includes:
protecting a first set of disks of the processing nodes utilizing a first global coding type; and
protecting a second set of disks of the processing nodes utilizing a second global coding type, wherein the first global coding type is different from the second global coding type.

20. The method of claim 16, wherein the plurality of disks comprises multiple sets of disks, and wherein storing the local redundant data on the at least one disk of the plurality of disks further comprises storing redundant data proportionally to a total number of disks in each set of the multiple sets of disks, and wherein storing the global redundant data on at least one disk of the plurality of disks local to the first processing node further comprises storing redundant data proportionally to a number of survivable node failures.

21. The method of claim 16, wherein the method further includes:
  determining the local redundant data utilizing a first erasure-correcting code type; and
  determining the global redundant data utilizing a second erasure-correcting code type, wherein the first erasure-correcting code type is different from the second erasure-correcting code type.

* * * * *